United States Patent

Kupinski et al.

Patent Number: 6,138,045
Date of Patent: Oct. 24, 2000

[54] METHOD AND SYSTEM FOR THE SEGMENTATION AND CLASSIFICATION OF LESIONS

[75] Inventors: Matthew A. Kupinski; Maryellen L. Giger, both of Chicago, Ill.

[73] Assignee: Arch Development Corporation, Chicago, Ill.

[21] Appl. No.: 09/131,162

[22] Filed: Aug. 7, 1998

[51] Int. Cl.<sup>7</sup> ...................................................... A61B 5/05

[52] U.S. Cl. ........................ 600/425; 382/131; 382/154; 378/37; 378/62

[58] Field of Search ................................... 600/407, 410, 600/425, 437; 128/920, 922, 915; 382/128, 131, 154, 168–172, 190–199; 345/418, 429, 419; 378/37, 62

[56] References Cited

U.S. PATENT DOCUMENTS

| | | | |
|---|---|---|---|
| 5,133,020 | 7/1992 | Giger et al. | 382/128 |
| 5,204,625 | 4/1993 | Cline et al. | 324/306 |
| 5,452,367 | 9/1995 | Bick et al. | 382/128 |
| 5,457,754 | 10/1995 | Han et al. | 382/128 |
| 5,832,103 | 11/1998 | Giger et al. | 382/130 |
| 5,903,664 | 5/1999 | Hartley et al. | 382/154 |

*Primary Examiner*—Brian L. Casler
*Attorney, Agent, or Firm*—Oblon, Spivak, McClelland, Maier & Neustadt, P.C.

[57] ABSTRACT

A method for the automated segmentation of an abnormality in a medical image, including acquiring first image data representative of the medical image; locating a suspicious site at which the abnormality may exist; establishing a seed point within the suspicious site; and preprocessing the suspicious site with a constraint function to produce second image data in which pixel values distant of the seed point are suppressed. Preprocessing includes using an isotropic Gaussian function centered on the seed point as the constraint function, or for example using an isotropic three dimensional Gaussian function centered on the seed point as the constraint function. The method further includes applying plural thresholds to the second image data to partition the second image data at each threshold; identifying corresponding first image data for the partitioned second image data obtained at each respective threshold; determining a respective index for each of the partitioned first image data; and determining a preferred partitioning, for example that partitioning leading to a maximum index value, based on the indices determined at each threshold, and segmenting the lesion based on the partitioning established by the threshold resulting in the maximum index. If desired, the first image data with the partitioning defined by the threshold which is determined to result in the maximum index, is then displayed. A system and computer readable storage medium are also provided, likewise using the radial gradient index (RGI) or a simple probabilistic models to segment mass lesions, or other similar nodular structures, from surrounding background. In the system, a series of image partitions is likewise created using gray-level information as well as prior knowledge of the shape of typical mass lesions. When the RGI is used, the partition that maximizes RGI is selected. When a probability model is used, probability distributions for gray-levels inside and outside the partitions are estimated, and subsequently used to determine the probability that the image occurred for each given partition. The partition that maximizes this probability is selected as the final lesion partition (contour).

30 Claims, 12 Drawing Sheets

METHOD AND SYSTEM FOR THE SEGMENTATION AND CLASSIFICATION OF LESIONS

The present invention was made in part with U.S. Government support under grant numbers DAMD 19-96-1-6058 and 17-97-1-7202 from the US Army Medical Research and Material Command and grant numbers RR11459 and T32 CA09649 from the USPHS. The U.S. Government has certain rights in this invention.

BACKGROUND OF THE INVENTION

1. Field of the Invention

The invention relates generally to a method and system for improved computerized segmentation and discrimination of lesions in medical images. Novel techniques in the segmentation of lesions include radial gradient segmentation and probabilistic segmentation using techniques such as constraint functions.

The present invention claims priority to U.S. patent application Ser. No. 08/900,361, filed Jul. 25, 1997, the contents of which are incorporated by reference herein. The present invention generally relates to CAD techniques for automated detection of abnormalities in digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; and 5,740,268; as well as U.S. patent application Ser. Nos. 08/158,388; 08/173,935; 08/220,917; 08/398,307; 08/428,867; 08/523,210; 08/536,149; 08/536,450; 08/515,798; 08/562,087; 08/757,611; 08/758,438; 08/900,191; 08/900,361; 08/900,362; 08/900,188; and 08/900,189, 08/900,192; 08/979,623; 08/979,639; 08/982,282; 09/027,468; 09/027,685; 09/028,518; 09/053,798; 09/092,004; 09/098,504; and 09/121,719 all of which are incorporated herein by reference.

The present invention includes use of various technologies referenced and described in the above-noted U.S. Patents and Applications, as well as described in the references identified in the appended APPENDIX and cross-referenced throughout the specification by reference to the number, in brackets and bold print, of the respective reference listed in the APPENDIX, the entire contents of which, including the related patents and applications listed above and references listed in the APPENDIX, are incorporated herein by reference.

2. Discussion of the Background

The segmentation of lesions from surrounding background is a vital step in many computerized mass-detection schemes for digital (or digitized) mammograms. Once the lesion is segmented, features can then be calculated using the segmentation information and more accurate classification can be accomplished.

Numerous techniques have been developed to segment lesions from surrounding tissues in digital mammograms. Petrick et al. [1] employed density-weighted contrast enhancement (DWCE) segmentation to extract lesions and potential lesions from their surrounding tissues. Comer et al. [2] and Li et al. [3] used Markov random fields to classify the different regions in a mammogram based on texture. A lesion segmentation algorithm was developed by Sameti et al. [4] which uses fuzzy sets to partition the mammographic image data. Despite the difficulty and importance of this step in many computerized mass-detection schemes, few have attempted to analyze the performance of these segmentation algorithms alone, choosing instead to collectively analyze all components of a scheme.

Here two methods are presented for segmenting lesions in digital or digitized mammograms, the radial gradient index (RGI)-based algorithm and a probabilistic algorithm. These techniques are seeded segmentation algorithms, which means that they begin with a point, called the seed point, that is defined to be within the suspect lesion. Many current computerized mass-detection schemes first employ an initial detection algorithm which returns locations that are used as seed points for the segmentation algorithm. In our previous works [5], a region-growing algorithm [6,7] was performed to extract the lesion from its surrounding tissues. Region-growing is a local thresholding process which utilizes only the gray-level information around the seed point. A series of partitions containing the seed point is created by thresholding and a rule determines which partition is to represent the partition of the suspect lesion. Potential problems with this algorithm are that the rules devised to choose the suspect lesion's partition are heuristic and often based on the first or second derivatives of noisy data.

SUMMARY OF THE INVENTION

Accordingly, an object of this invention is to provide a method and system for segmenting lesions in medical images.

Another object of this invention is to provide an automated method and system for the enhancement of lesions in medical images using constraint functions.

Another object of his invention is to provide an automated method and system for the segmentation of lesions based on a radial gradient index technique.

Another object of his invention is to provide an automated method and system for the segmentation of lesions based on probabilistic models in which tile utility function is a probability.

These and other objects are achieved according to the invention by providing a new and improved automated method, storage medium storing a program for performing the steps of the method, and system in which segmentation and/or discrimination of lesions in a medical is performed. The method, on which the system is based, induces acquiring first image data representative of the medical image; locating a suspicious site at which the abnormality may exist; establishing a seed point within the suspicious site; and preprocessing the suspicious site with a constraint function to produce second image data in which pixel values distant of the seed point are suppressed. The preprocessing step includes using an isotropic Gaussian function centered on the seed point as the constraint function, or for example using an isotropic three dimensional Gaussian function centered on the seed point as the constraint function.

The method further includes partitioning the site using the second image data to identify pixels in the first image data, and calculating an index based on the identified pixels in the first image data. Partitioning includes applying plural thresholds to the second image data to partition the second image data at each threshold; identifying corresponding first image data for the partitioned second image data obtained at each respective threshold; determining a respective index for each of the partitioned first image data; and determining a preferred partitioning, for example that partitioning leading to a maximum index value, based on the indices determined at each threshold in the preceding step, and segmenting the lesion based on the partitioning established by the threshold resulting in the maximum index. If desired, the first image data with the partitioning defined by the threshold which is determined to result in the maximum index is then displayed.

According to the method of the invention, the step of calculating an index includes calculating a radial gradient index or using a probabilistic measure to calculate the index. When the latter probabilistic measure is used, the method uses the probabilistic measure to calculate contributions to the index by computing contributions to the index based on pixel values both within and outside of a partitioned region established at respective of the thresholds.

In performing the method of the present invention, it is first necessary to determine locations of suspicious sites which may include lesions. To that end, breast segmentation is performed as disclosed in U.S. Pat. No. 5,452,367: two images of a patient's left and right breasts are segmented so that to determine which portions of the image correspond to breast regions and which are not. Then, an initial detection is made, in which the breast segmentation information is used to align the left and right images based on the breast borders. Bilateral subtraction in which the two images are then subtracted (non-linearly) and a series of detection points are returned is performed, as disclosed in U.S. Pat. No. 5,133,020. The two sets of detection points (one set for the left image and the other for the right image) are "suspect sites" in the mammogram that could correspond to breast masses. These suspicious sites are examined more closely in subsequent steps to try and determine if each suspicious site is a breast mass or not.

Then, lesion segmentation is performed. The detection points (or suspicious sites) are then used as seed points for the lesion segmentation algorithm of the present invention. Each detection point is looked at individually and the lesion segmentation algorithm segments the potential lesion from the surrounding background tissues. At this point in the procedure every suspicious site has been segmented to produce a contour describing the shape or every suspicious site. Once a lesion contour is obtained at each suspicious site, feature extraction and classification analysis is performed to distinguish between a true lesion and normal breast tissues, using the computer aided diagnosis techniques disclosed in U.S. patent application Ser. Nos. 08/5 15,798 and 08/982,282. The features extracted from each detection site are classified (one by one) as either normal tissues or a actual breast mass. The sites that are classified as breast masses are returned by the detection program as the actual abnormalities in the two images.

The present invention thus aims to solve the problems associated with conventional region-growing. The present invention has the advantages of utilizing shape constraints to regularize the partitions analyzed, and dramatically simplifying the partition selection process by using utility functions based either on probabilities or a single feature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
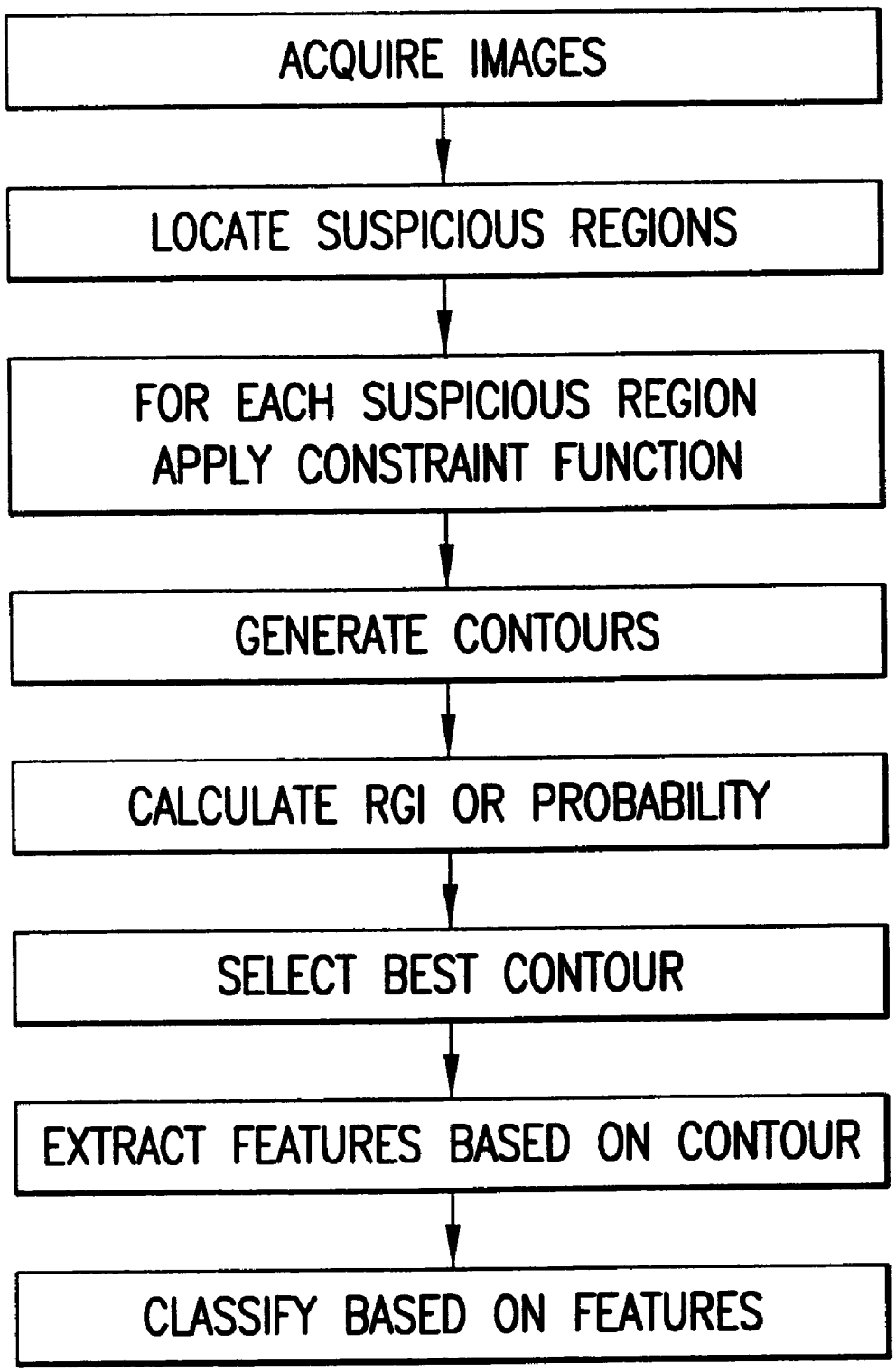
FIG. 1 is a flow chart of the enhanced lesion segmentation method according to the present invention.

Referring now to the drawings, and more particularly to FIG. 1 thereof, a schematic diagram of the automated method for the segmentation of lesions in medical images is shown. The overall scheme includes an initial acquisition of a medical image and digitization. Next the location of suspect lesions is determined either by humans or automated or interactive computerized methods. Preprocessing of the images region is performed using a constraint function. Next region growing is performed using either a radial gradient index technique or probabilistic methods. Features from and about the lesion are then extracted.

Enhancement of Lesion with Constraint Function

Given a sub-image or region of interest (ROI) of dimension n by m containing the suspect lesion, the set of coordinates in this sub-image is defined as:

$$I=\{(x,y):x=1,2,\ldots,n \text{ and } y=1,2,\ldots,m\} \quad (1)$$

The function describing the pixel gray levels of this sub-image is given by f(x, y) where $(x,y) \in I$. The values of f(x, y), for this work, are bound between 0 and 1 with a 0 representing black and a 1 representing white. The pixel values for all images were normalized to be within this range by dividing by the maximum pixel value possible for the digitizer used. The task of a lesion segmentation algorithm is to partition the set I into two sets: L which contains the coordinates of lesion pixels, and ~L which contains surrounding background pixels. The lesion segmentation algorithms according to the present invention are seeded segmentation algorithms; an initial point is used to start the segmentation. The seed point $(\mu_x,\mu_y)$ is defined to be within the lesion, i.e., $(\mu_x,\mu_y) \in L$ for all L. In addition, the perimeter of the set L must be one continuous closed contour.

Figure 2A:
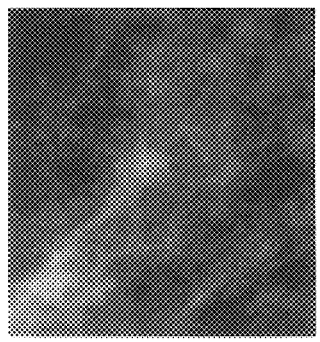
FIGS. 2(a), 2(b) and 2(c) are respectively (a) original image; (b) an image illustrating . Partitions that can arise when only gray-level information, f(x,y) is utilized in segmenting lesions; and (c) an image obtained when the gray-level image is multiplied by a constraint function to control the shape of the partitions, h(x, y).
Figure 2B:
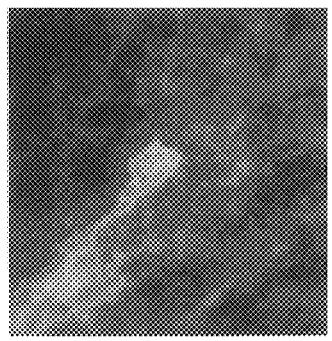

In order to segment the potential lesion, the "validity" of various image partitions $L_i; i=1,\ldots,T$ is evaluated. For conventional region growing segmentation, the partitions are typically defined as $$L_i^{(rg)}=\{(x,y):f(x,y)>t_i\} \quad (2)$$

where $t_i$ is a gray-level threshold. This technique makes use of the fact that lesions tend to be brighter than the surrounding tissue, but it does not directly take shape into account, i.e., irregular shapes can be evaluated. Shape is, however, typically indirectly analyzed in these methods when searching for the partition to represent the segmented lesion [7, 8]. FIG. 2(b) shows an example of some of the irregular, partitions that can arise in conventional region growing. The partitions are lesion-shaped at high thresholds but tend to effuse into the background at lower thresholds and are not representative of the lesion.

Figure 3A:
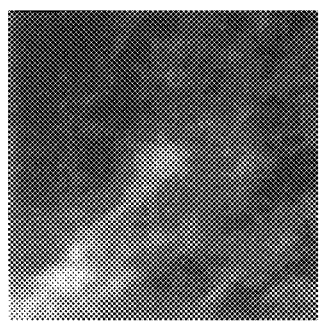
FIGS. 3(a), 3(b) and 3(c) are respectively (a) an image f(x, y) of the lesion multiplied by tile Gaussian function; (b) an image of $N(x, y; \mu_x, \mu_y, \sigma_c^2)$ to constrain the partitions to have "lesion-like" shapes, which results in (c) the function h(x,y), wherein the value of a $\sigma_c^2$ was set to $12.5^2$ mm$^2$ for these image.
Figure 3B:
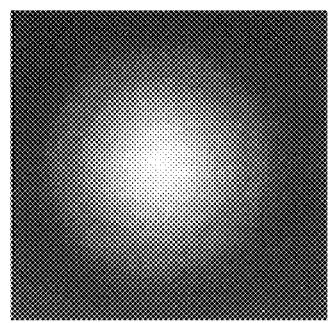
Figure 3C:
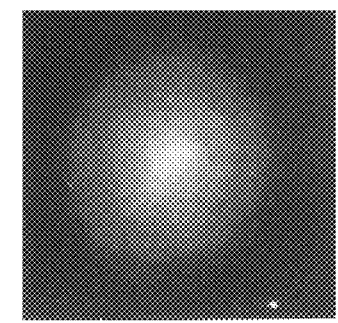

Conventional region growing defined the lesion partitions $L_i^{(rt)}$ based solely on gray-level information in the image. The algorithms according to the present invention add additional a-priori information into the creation of the lesion partitions. Lesions tend to be compact, meaning that their shapes are typically convex. To incorporate this Knowledge into the creation of the partitions, the original image is multiplied by a function, called the constraint function, that suppresses distant pixel values. An isotropic Gaussian function centered on the seed point location $(\mu_x,\mu_y)$ with a fixed variance $\sigma_1^2$ is therefore chosen as the constraint function. The function h(x, y) resulting from the multiplication of the original ROI with the constraint function is given by $$h(x,y)=f(x,y)N(x,y;\mu_x,\mu_y,\sigma_c^2) \quad (3)$$

where $N(x,y;\mu x,\mu y,\sigma_c^2)$ is a circular normal distribution (see FIG. 3(b)) centered at $(\mu x,\mu y)$ with a variance $\sigma_c^2$. Other constraint functions may be more appropriate for different segmentation tasks. The inventors found, however, that a Gaussian works well for mammographic lesions. FIG. 3(c) shows an example of the function h(x, y). At a given threshold, the partitions returned by thresholding are more compact than before because distant pixels are suppressed, i.e., a geometric constraint has been applied. The new partitions are defined as $$L_i=\{(x,y):h(x,y)>t_i\}. \quad (4)$$

Figure 2C:
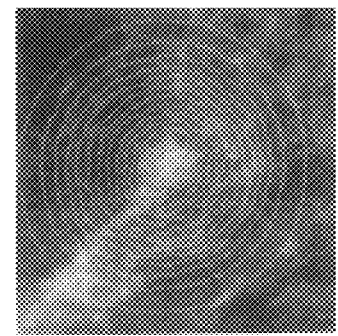

An example is shown in FIG. 2(c). Note that all of the partitions are now "lesion-like;" they are influenced by both the gray-level information and the geometric constraint. The value of the parameter $\sigma_c^2$ will be discussed later.

Region Growing Segmentation

Figure 4:
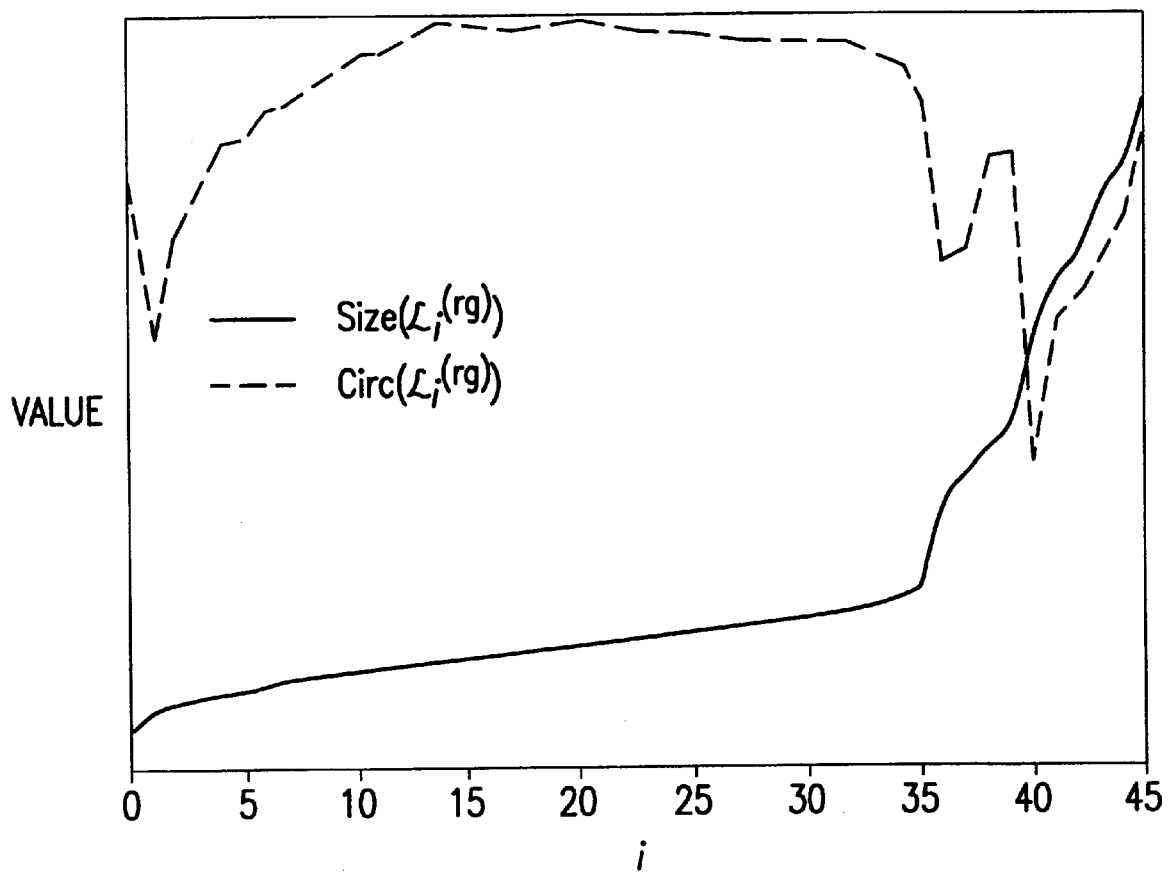
FIG. 4 is a graph illustrating features employed in determining the final partition for conventional region growing. Where i corresponds to the different gray-level intervals.

In conventional region growing, a, feature or multiple features likely may be calculated for the partitions described in Eqn. 2. For example, circularity Circ( ) and size Size ( ) can be calculated for every $L_i^{(rg)}$ as demonstrated in FIG. 4. The final partition is chosen by analyzing these functions and determining transition points or jumps in the features [5, 7, 8]. As FIG. 4 shows, the data can exhibit multiple transition points, and determining a jump by analyzing the first derivative of noisy. If a transition point cannot be found, the segmentation algorithm falls to return a final partition.

Radial Gradient Segmentation

Figure 6:
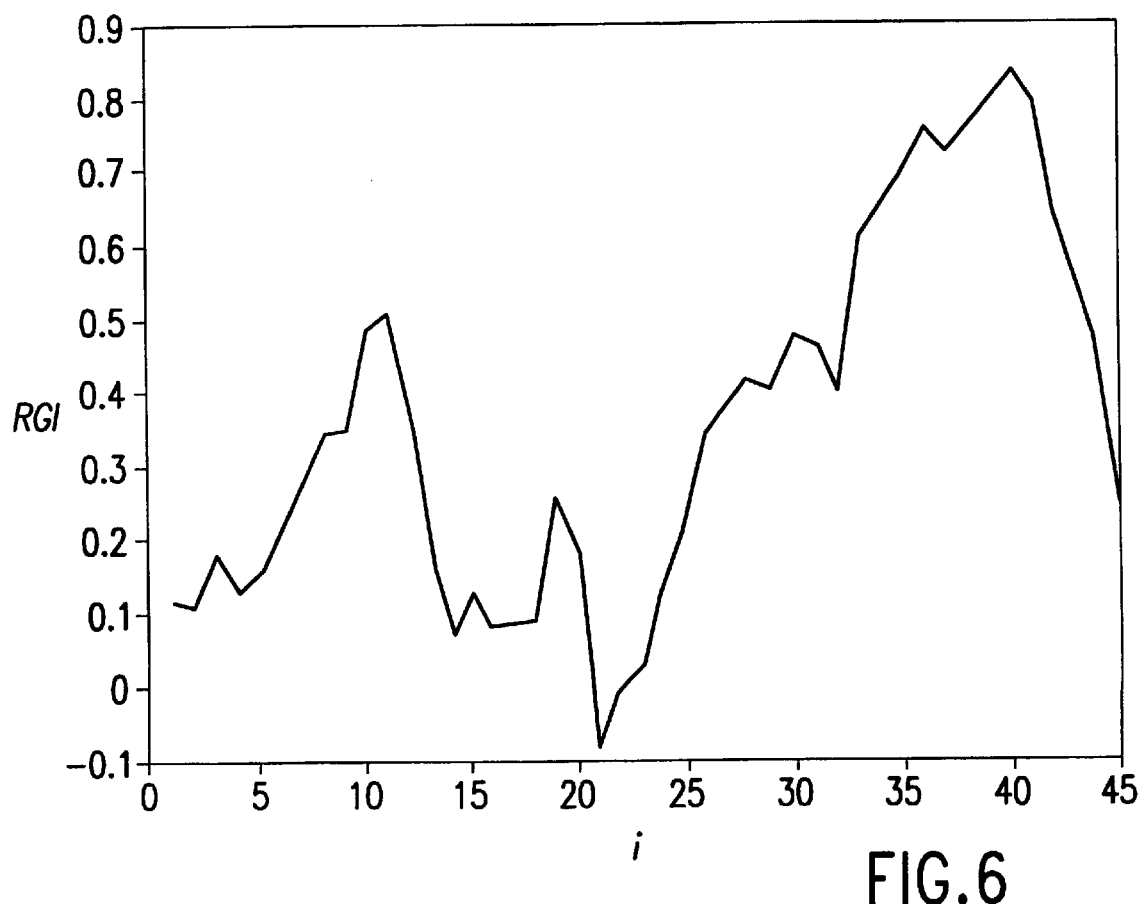
FIG. 6 is a graph illustrating the radial gradient index as a function of the different partition $L_i$ for the image shown in FIG. 2(a), wherein the partition with the largest RGI value is returned as the final lesion partition, and i corresponds to the different gray level intervals.

Given a series of partitions $L_i$ from Eqn. 4. one must determine which of these partitions best delineates the lesion. One method is to apply a utility function. Bick et al. [9] employed a radial gradient index utility function in his lesion segmentation algorithm that utilized Fourier descriptors to describe the shapes of lesions. The present invention employs the RGI measure on the image f(x, y) around the margin of each partition $L_i$ as a utility function. For every partition $L_i$ the radial gradient index is calculated (see FIG. 6), and the partition with the maximum RGI is returned as the final lesion partition. It is important to note that the partitions $L_i$ are generated using the processed image h(x y) while the RGI measure is computed on the original image f(x,y).

Computation of the radial gradient index is next discribed. Given a partition $L_i$ (Eqn. 4) the margin can be defined as:

$$m_i=\{(x,y):(x,y)\in L_i \text{ and either}$$
$$(x-1,y),(x+1,y),(x,y+1), \text{ or } (x,y-1) \notin L_i\} \quad (5)$$

Figure 5:
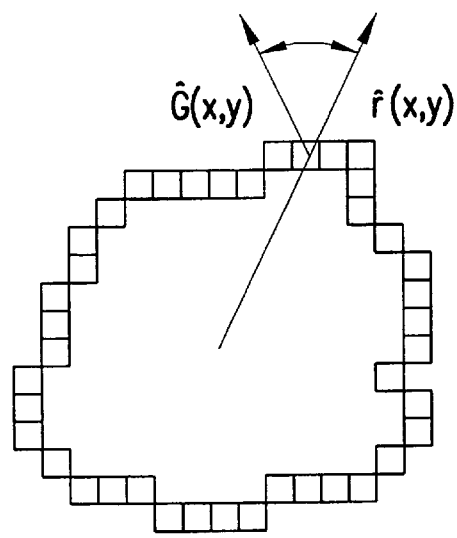
FIG. 5 is an illustration of the geometry used in calculating the radial gradient, index, wherein the squares represent margin pixels $M_i$ of the partition $L_i$ being evaluated.

This states that a point is on the margin if it has at least one neighbor that is not in the lesion. The radial gradient index is given by $$RGI = \left(\sum_{(x,y)\in M_i} \|\hat{G}(x,y)\|\right)^{-1} \sum_{(x,y)\in M_i} \hat{G}(x,y) \cdot \frac{\hat{r}(x,y)}{\|\hat{r}(x,y)\|} \quad (6)$$

where $\hat{G}(x, y)$ is the gradient vector of f(x,y) at position (x, y) and $$\frac{\hat{r}(x,y)}{\|\hat{r}(x,y)\|}$$

is the normalized radial vector at the position (x,y) (FIG. 5). The RGI is a measure of the average proportion of the gradients directed radially outward. An RGI of 1 signifies that all the gradients around the margin are painting directly outward along the radius vector and an RGI of −1 indicates that all the gradients around the margin are pointing directly inward towards the center of the partition. The RGI value around the margin of a circular lesion, for example, is 1. If, however, f(x,y) is a uniform image, then the RGI value will be 0 even if the margin $M_i$ is a circle.

Probabilistic Segmentation

The segmentation method based on probabilistic models is somewhat similar to the RGI method, except that the utility function is now a probability. The probability of pixel gray levels given a partition $L_i$ (Eqn. 4) is modeled as $$p(f(x,y)|L_i,\sigma_1^2) = \{N(f(x,y);f(\mu_x,\mu_y),\sigma_1^2):(x,y)\in L_i$$

$$z(f(x,y)):(x,y)\in L_i \quad (7)$$

where $N(f(x, y); f(\mu_x,\mu_y), \sigma_1^2)$ is a normal distribution centered at the seed point gray level $f(\mu_x,\mu_y)$ with a variance $\sigma_1^2$, and $z(f(x, y))$ is a function to be described later. Lesions will not exhibit a large variation in pixel values, while the tissues surrounding the lesion may show large variation because they may consist of both fatty and dense regions. The uniformity of lesions is accounted for by a small variance Gaussian function centered around the seed pixel value. The term $z(f(x, y))$ is a function that is estimated for each ROI using the gray levels from all of the pixels within the region of interest although it is only employed in calculating $p(f(x,y) |L_i,\sigma_1^2)$ for $(x, y) \notin L_i$ (see Eqn. 7). Finally the probability of the image (or ROI) I given a partition $L_i$ is $$p(I|L_i\sigma_I^2) = \prod_{(x,y)\in I} p(f(x,y)|L_i,\sigma_I^2). \quad (8)$$

The partition $L_i$ that is chosen is the one that maximizes the probability $p(I|L_i,\sigma_1^2)$, i.e., $$p(I|L_{final},\sigma_1^2 = \mathrm{argmax}_i\{p(I|L_i,\sigma_1^2)\}. \quad (9)$$

Figure 7:
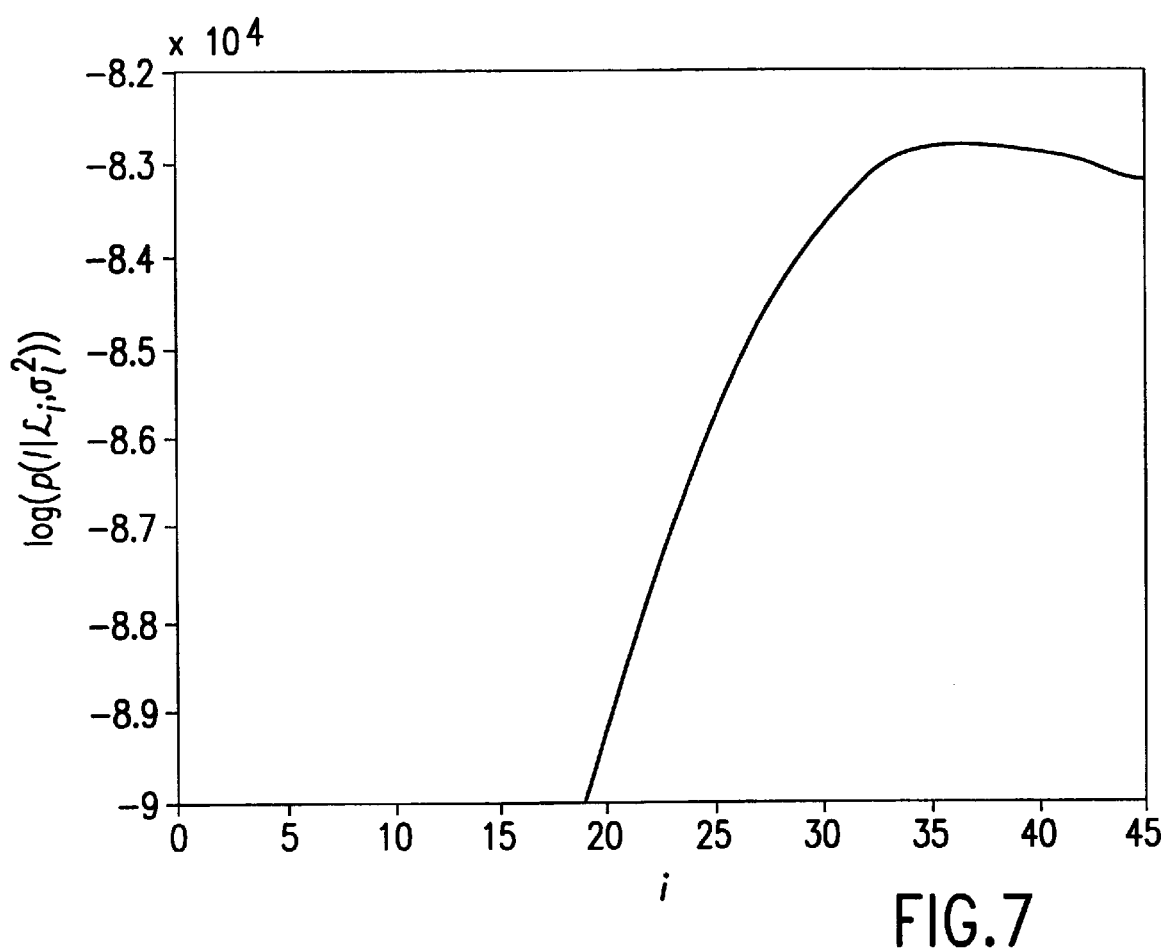
FIG. 7 is a plot of the probability that the image occurred at different $L_i$ for the image shown in FIG. 2(a), where the maximum likelihood estimate of the partition is given by the partition which maximizes this function, and i corresponds to the different gray-level intervals.
Figure 8A:
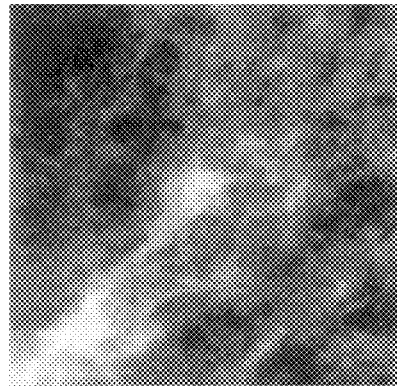
FIGS. 8(a), 8(b), 8(c) and 8(d) are respective illustrations of (a) an original image including a high contrast lesion; and images showing segmentation results for the high contrast lesion using (b) region growing segmentation, (c) RGI-based segmentation, and (d) probabilistic segmentation.
Figure 8B:
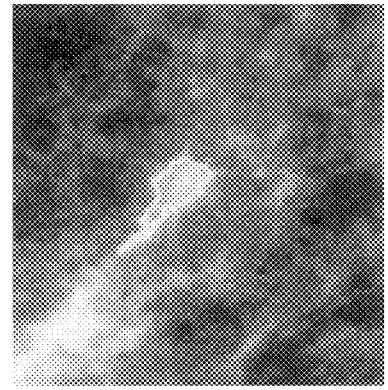
Figure 8C:
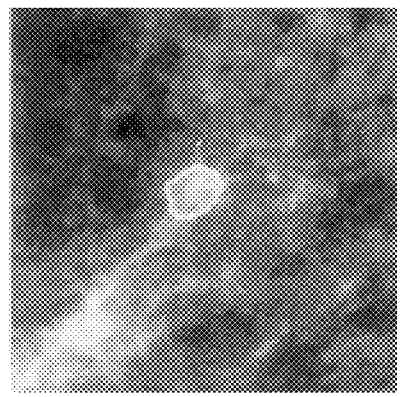
Figure 8D:
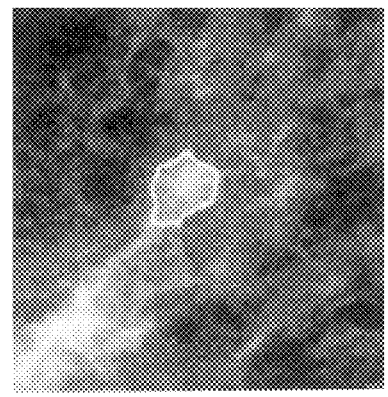
Figure 9A:
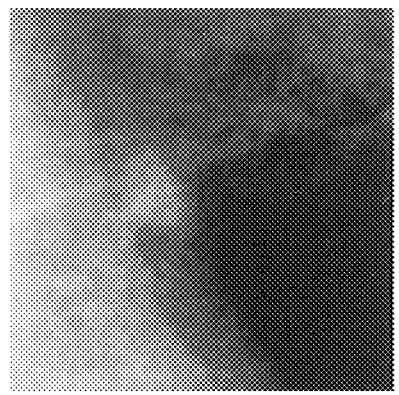
FIGS. 9(a), 9(b), 9(c) and 9(d) are respective illustrations of (a) an original image including a lesion on the boundary between a fatty area and the pectoralis muscle; and images showing segmentation results for the lesion using (b) region growing segmentation, (c) RGI-based segmentation, and (d) probabilistic segmentation.
Figure 9B:
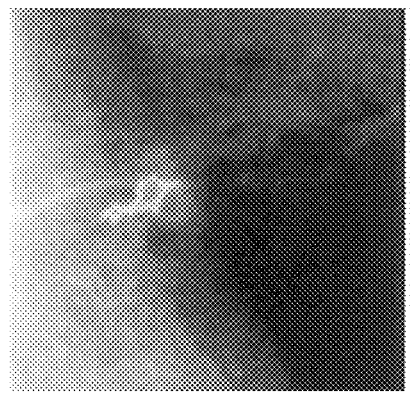
Figure 9C:
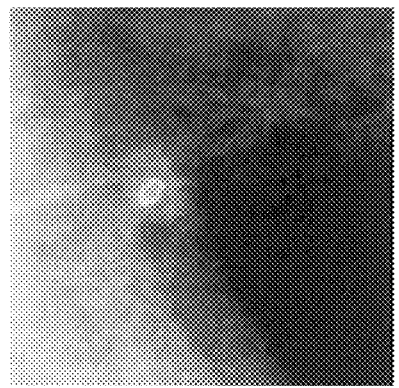
Figure 9D:
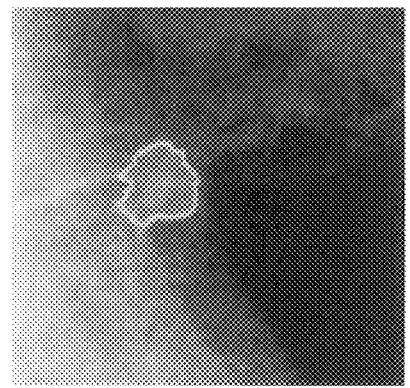

An example plot of $p(I|L_i,\sigma_1^2)$ is shown in FIG. 7. Because there are a finite number of $L_i$ the complexity of an optimization problem choosing is avoided and instead all $L_i$ are evaluated and the maximum determined.

Figure 10:
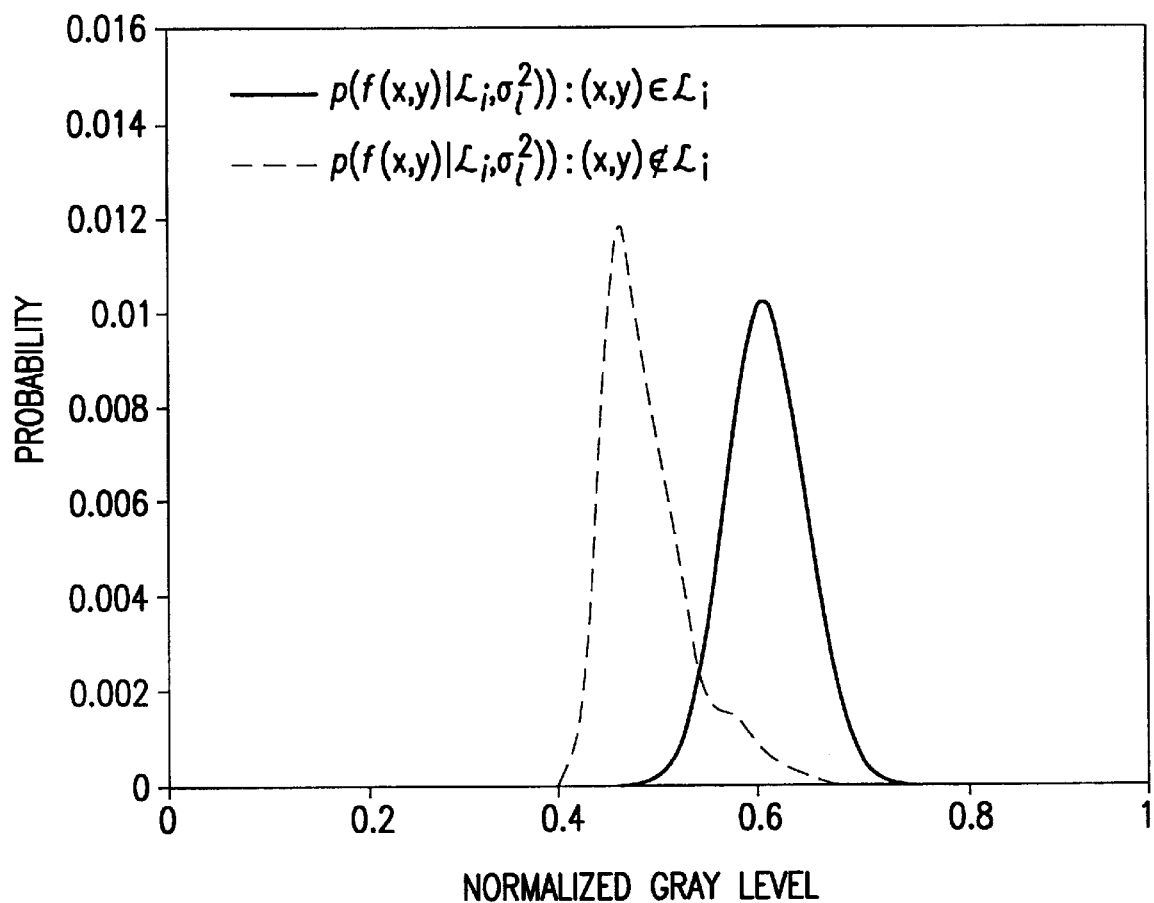
FIG. 10 is a graph illustrating probability distributions employed when a pixel is inside or outside of the set in question for the image shown in FIG. 8, wherein the distribution employed when $(x, y) \in L_i$ is a Gaussian centered at the seed point gray level with a variance of $\sigma_1^2$, and the distribution $z(f(x,y))$ is employed when $(x,y) \notin L_i$ and is estimated from all gray values within the ROI.
Figure 11:
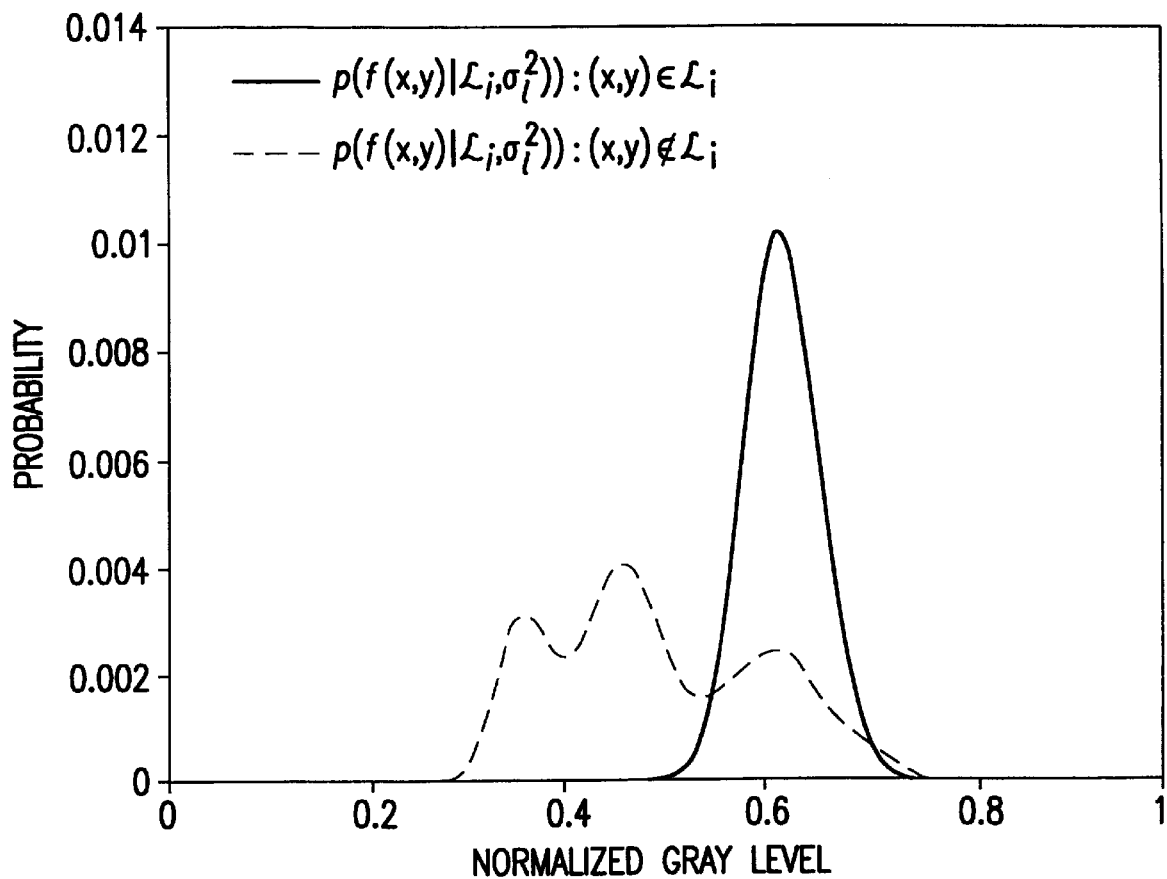
FIG. 11 is a graph illustrating probability distributions employed when a pixel is inside or outside of the set in question for the ROI shown in FIG. 9, wherein the distribution employed when $(x, y) \in L_i$ is a Gaussian centered at the seed point gray level with a variance of $\sigma_1^2$, and the distribution $z(f(x,y))$ is employed when $(x,y) \notin L_i$ and is estimated from all gray values within the ROI.

The probability distribution for the gray levels when the pixels are outside the set $L_i$ is given by the function $z(f(x,y))$ (see Eqn. 7), which is estimated from all gray levels within the ROI. Kernel density estimation using an Epanechnikov kernel was employed to estimate this distribution [10]. The width of the kernel was optimally determined through cross-validation [10]. Kernel density estimation is a method similar to histogram analysis except that a non-rectangular kernel is used to bin data and this kernel is swept across the function axis continuously. Histogram analysis, on the other hand, uses a box-function that is moved in increments of the box width. FIGS. 10 and 11 show the calculated probability distributions for gray levels inside and outside $L_i$ the ROIs shown in FIGS. 8 and 9, respectively.

Parameter Estimation

The width $\sigma_c^2$ of the constraint function in Eqn. 3 was determined based on knowledge of lesions and was not statistically determined. A value of $12.5^2$ mm$^2$ was empirically determined to work well for purposes of the present invention. Larger lesions were also segmented with this value but speculations and small deviations around the edge of the lesion were usually not delineated.

Figure 12:
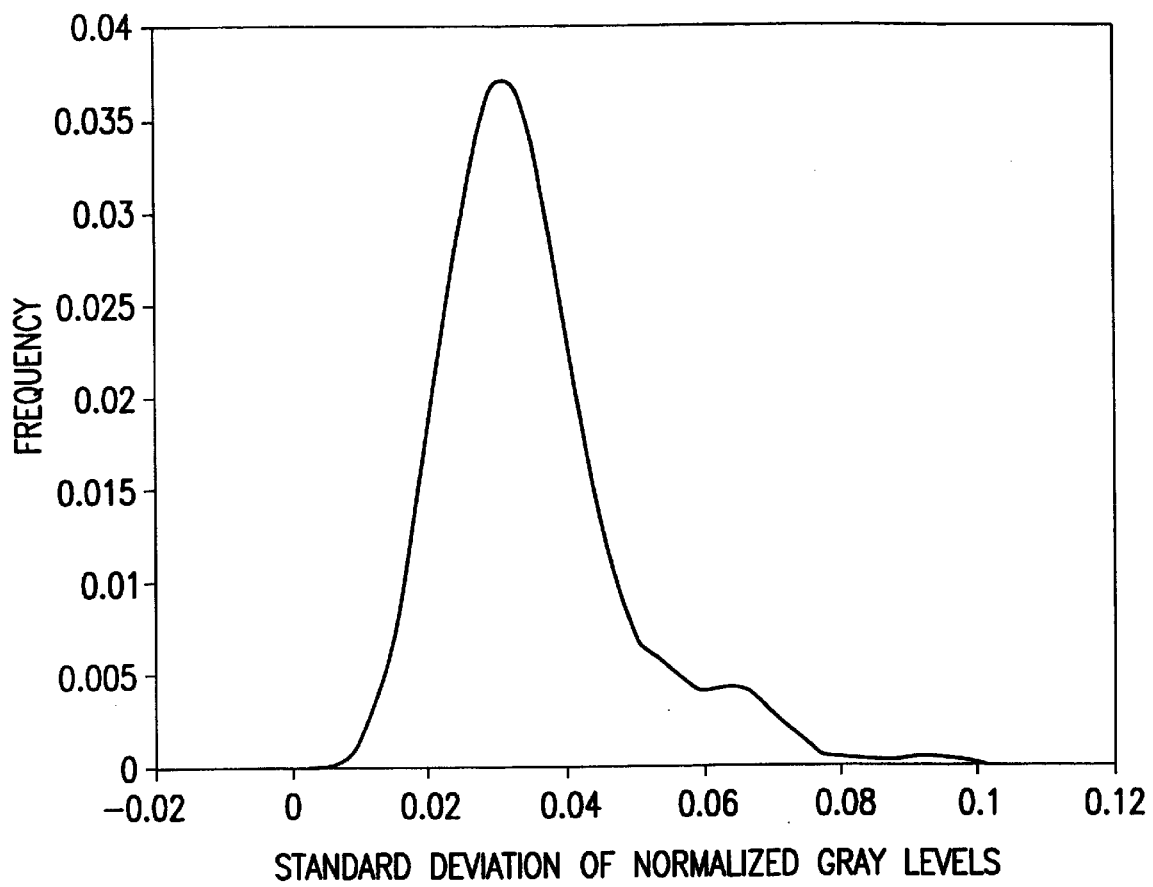
FIG. 12. The distribution of standard deviations of the gray levels within tile radiologist's outlined lesions for a database of 60 malignant lesions (118 ROIs). The pixel values of the images were normalized to be between 0 and 1.

The parameter $\sigma_1^2$ in Eqn. 7 is an unknown quantity and must be determined. The average variation of the gray levels within the radiologist's outlined truth for a screening, malignant database of 118 visible lesions was estimated. FIG. 12 shows the density distribution for these variations as measured by the standard deviation of the gray levels within the radiologist's outlines. A value of 0.038 was determined to be the most common standard deviation of pixel values within the radiologist's outlines. It is important to note that problems may arise when the radiographic presentation of lesions in other databases are substantially different from those in the database employed in derivation of the present invention. The inventors, however, employed a database of 60 malignant, non-palpable lesions obtained from roughly 700 needle biopsies performed during the years 1987 to 1993, and thus, should be representative of the actual distribution.

The value of $\sigma_1^2$ can also be determined for each lesion individually. Instead of just using the most probable a-priori value of $\sigma_1^2$ (as discussed above) one can apply Bayes' theorem to find that $$p(\sigma_1^2|I, L_i) = \frac{p(I|L_i, \sigma_1^2)p(\sigma_1^2|L_i)}{p(I|L_i)}. \quad (10)$$

where $P(I|L_i, \sigma_1^2)$ is given y Eqn. 8. If we assume that $\sigma_1^2$ and $L_i$ are independent then $p(\sigma_1^2|L_i)=p(\sigma_1^2)$. The distribution of $p(\sigma_1^2)$ can be obtained from FIG. 12. Finally we know that $p(I|L_i)=\int d\sigma_{1p}(I|L_i, \sigma_1^2)p(\sigma_1^2)$ which results in $$p(\sigma_1^2|I, L_i) = \frac{p(I|L_i, \sigma_1^2)p(\sigma_1^2)}{\int d\sigma_1 p(I|L_i, \sigma_1^2)p(\sigma_1^2)}. \quad (11)$$

The probability of various values of $\sigma_1^2$ could be compared against each other and the optimal $\sigma_1^2$ estimated. Unfortunately, to estimate $p(\sigma_1^2 |L_i)=p(\sigma_1^2)$ one must compute $$\int d\sigma_{1}p(I|L_i, \sigma_1^2)p(\sigma_1^2), \quad (12)$$

which involves integrating over all possible values of $\sigma_1$ and is very time consuming. Not only is there the problem of integrating over all $\sigma_1$ values but the value computed is the probability given a partition $L_i$. This results in a dual optimization task. For a given $\sigma_1^2$ the optimal partition $L_{final}$ is determined. This partition is then employed to determine a new optimal $\sigma_1^2$. This process continues until there is convergence. In derivation of the present invention, the inventors instead employed a constant value. i.e., the most probable a-priori value of $\sigma_1^2$.

Bayesian analysis could be applied to the probabilistic segmentation algorithm resulting in:

$$p(L_i|I, \sigma_1^2) = \frac{p(I|L_i, \sigma_1^2)p(L_i)}{p(I)}. \quad (13)$$

By analyzing Eqn. 13 one finds that the $p(L_i)$ is a term that penalizes partitions which are not "lesion" shaped. The partitions in our study, however, are obtained after the shape constraint function (Eqn. 4) has been applied so every partition analyzed is "lesion" shaped and thus, a Bayesian analysis is not necessary. If deformable contours are employed instead of a series of lesion-shaped partitions, then Bayes' rule (Eqn. 13) should be applied.

Qualitative Explanation

The above discussion is a relatively analytical explanation of segmentation performed according to the present invention. A more qualitative discussion of this segmentation is next presented.

Preprocessing by application of the constraint function is performed prior to performing one or the other of the two segmentation algorithms in according to the present invention. Preprocessing typically includes:.

1: A single detection point is used a the initial seed point of the lesion segmentation algorithm. Using this seed point we cut (digitally) a region of interest (ROI) from the mammogram. This ROI is basically a sub-image centered around a single seed point. See FIG. 3a.

2: Then the constraint function in Step 1 is created. See FIGS. 3b.

3: The area about the seed point is multiplied by the constraint function created in Step 2 to arrive at a constrained image (i.e., a processed version of the original image ROI). See FIG. 3c.

4: The constrained image (FIG. 3c) is then thresholded numerous times at thresholds ranging from the minimum pixel value to the maximum pixel value in the constrained image to generate a series of partitions. The contours of these partitions are shown in FIG. 2c. (It may be easier to think of the constrained image as the constrained ROI).

Now the task is to determine which of the partitions (FIG. 2c) best represent the true lesion shape. To accomplish this an index using the original image (FIG. 3a) and the generated partitions (FIG. 2c) is calculated. This index is either the radial gradient index or the probabilistic measure. (Note that the partitions (contours) are determined from the contrained image and the index (such as the radial gradient index) is determined off the original image data.

The steps performed in determining a radial gradient index value include:

Step 1: The contour surrounding each partition is created (FIG. 2c).

Step 2: For each contour the radial gradient index (RGI) value (see equation 6) is calculated. The RGI is a function of the gradient of the original image at each contour point and the radius of each contour point relative to the seed point value.

Step 3: An RGI value for each partition is thus obtained. Then the RGI values (FIG. 6) are compared and the partition that has the largest RGI value, for example, is chosen as the segmentation result for that given seed point.

The steps performed in determining the probabilistic measure are next described:

Step 1: First two probability functions of gray-levels are generated. This simply means that for each possible gray level value in an image one can either look at one of two functions to determine a probability that that gray-level should have occurred. The two probability functions represent the probabilities of the gray-levels within a particular partition and the probabilities of gray-levels outside a particular partition. The probabilities within a partition are modeled as a simple Gaussian function centered at the seed point pixel value (the solid lines in FIGS. 10 and 11). The probabilities of gray-levels outside a particular partition are generated using probability density estimation (a well known and often used technique) which uses all pixel values in the region of interest to determine an estimate of each pixel value's probability (The dashed lines in FIGS. 10 and 11).

Step 2: So for a given partition a probability image is produced, i.e., each pixel location in the image contains a probability. All those probabilities are then multiplied together to derive a probability for that ROI with that given partition. That is, given a partition, and given the probablility of the pixel values within the partition (i.e. the suspect abnormality location) and given the probability of the pixel values outside the partition (i.e. in the background), it is determined which partition best represents the model, i.e., the abnormality. This process is repeated for every partition (FIG. 2c) and so for each partition a probability is determined. That partition exhibiting the highest probability represents the margin of the abnormality.

Step 3: So, as in the RGI case, the partition that has the largest value, for example, for this probability is chosen. (See FIG. 7.)

Segmentation Performance

Segmentation results for a, relatively simple (high contrast) lesion are shown in FIGS. 8(a)–8(d). All three methods, region growing, RGI-based segmentation. and probabilistic segmentation, perform well on this lesion. Region growing has somewhat undergrown the lesion and has a long tail. The RGI-based method and the probabilistic method segment the lesion better than region growing. Similar images are shown for a more difficult lesion on a border between a fatty region and the pectoralis muscle in FIGS. 9(a)–9(d). Because of the brightness of the pectoralis muscle, region growing effuses into the background too soon and thus, the transition point found results in a grossly undergrown lesion. There are also vessels that can be radiographically seen passing through the center of this lesion. The RGI-based segmentation algorithm chooses the boundary of a vessel as the best partition because the RGI value around the vessel is larger than that around the actual lesion. The probabilistic segmentation algorithm, however, does not get confused by the vessel inside the lesion and correctly segments this difficult lesion.

In order to quantify the performance differences between the three different segmentation methods, the segmentation results were compared against radiologists' outlines of the lesions. The screening database of non-palpable, biopsy-proven, malignant cancers with a total of 118 visible lesion ROIs was employed. For each lesion the seed point was calculated from the center of mass of the radiologist's outlines. Once the lesion was segmented, an overlap measure O was calculated using the set returned from the segmentation algorithm L and the radiologist's hand-drawn segmentation set E. The overlap O is defined as the intersection over the union, i.e., $$O = \frac{Area(L \cap T)}{Area(L \cup T)}. \tag{14}$$

The value of O is bound between 0 (no overlap) and 1 (exact overlap). A threshold needs to be set in order to classify a result as an "adequate" segmentation. i.e., if O is greater than a certain value then the lesion is considered to be correctly segmented.

Figure 13:
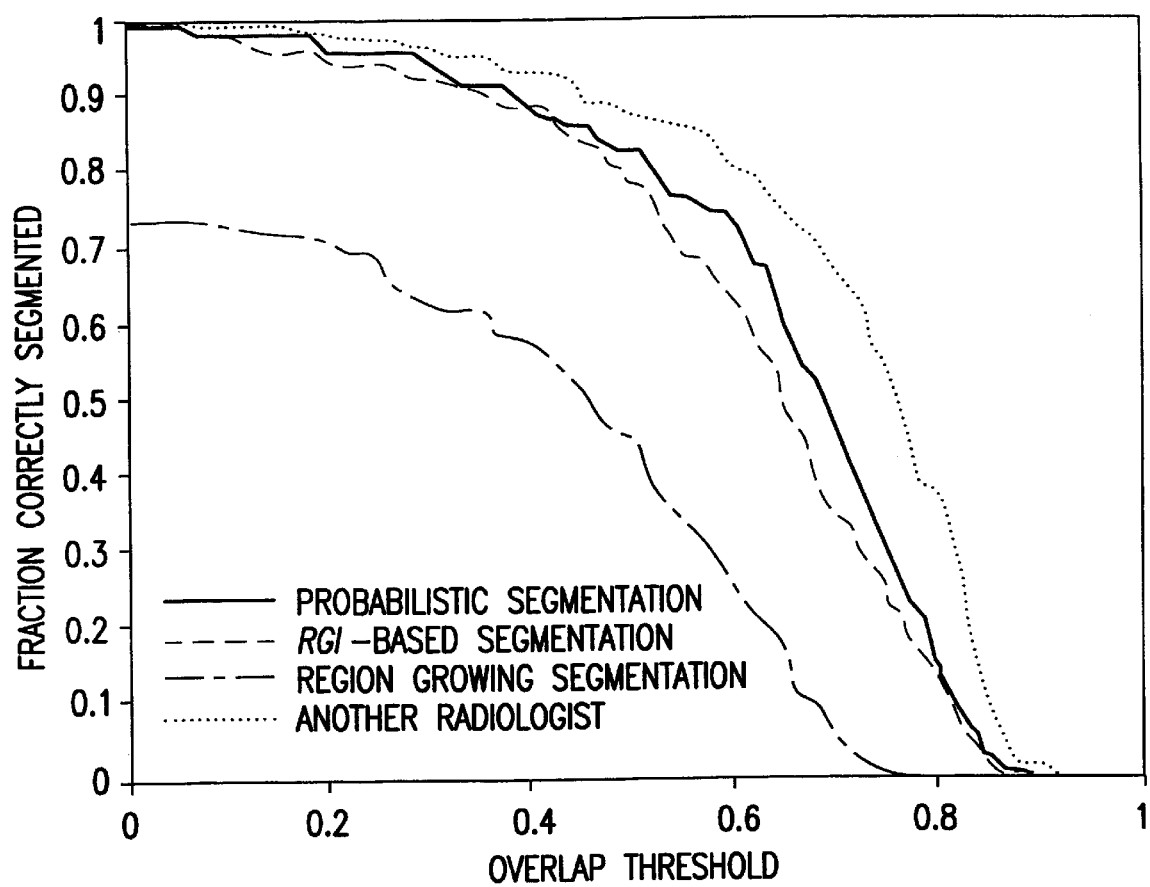
FIG. 13 is a graph illustrating the performance of the different segmentation methods on a database of malignant lesions as compared with a radiologist's outlines, as well as the agreement of another radiologist's outlines of the lesions in the databases with the outlines of the first radiologist.

FIG. 13 shows a plot of the fraction of lesions correctly segmented at various overlap threshold levels. The probabilistic segmentation algorithm outperformed the other methods. Also shown in FIG. 13 is the performance of a different radiologist in extracting the lesions as compared with the first radiologist. It is interesting to note that the performances of the RGI-based and probabilistic methods are not too dissimilar from the human performance. Region growing never yielded all lesions correctly segmented even when the overlap threshold was zero because the method failed to find a transition point in many of the images. At an overlap threshold of 0.30, gray level region growing correctly delineates 62% of the lesions in our database while the RGI algorithm and probabilistic segmentation algorithms correctly segment 92%, and 96% of the lesions, respectively.

The assumption throughout the above analysis has been that appropriate partitions can be generated by gray-level thresholding the function h(x,y) (Eqn. 3). This assumption, as is shown by the results of this paper, is generally appropriate for most lesions. There are, however, cases where thresholding h(x, y) does not, generate adequate partitions for a given lesion. In some cases, oddly shaped lesions may be surrounded by glandular structures which may confuse the algorithm into calling those normal structures part of the lesion. Speculations, which are common in malignant lesions, are, in general, not included in the final lesion partition because of the application of the constraint function. The purpose of the segmentation algorithm, of the present invention, however, is to determine the general shape of the lesions and not necessarily the detailed shape in which all speculations are demarcated.

There is an implicit model that arises from the density functions employed in the probabilistic segmentation algorithm. Equation 7 assumes that all pixels within the lesion come from a Gaussian distribution centered at the seed point pixel value. The, lesion model from which this distribution arises is a very simple one: a lesion has uniform gray levels with fluctuations arising from both noise and structure. In the future, more complex models, such as modeling a lesion as a projection of a sphere can be implemented. The distributions, however, become more difficult with which to work and the assumption of independence in Eqns. 8 and 10 is no longer valid.

Different initial seed points will result in different segmentation results. For both the RGI-based and probabilistic segmentation algorithms, the results are very similar given small changes in the seed point location. If, however, the seed point is selected to be at the very edge of the lesion, then the final partitions returned by both the RGI-based and probabilistic algorithms will be poor.

Three segmentation methods at various overlap criteria (FIG. 13) were comparatively evaluated because different investigators may use different evaluation criteria as well as different databases. Previously, it has been shown that the reported performance of a computer detection method can greatly vary depending on the criteria used in tabulating sensitivity and specificity [11].

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art.

The present invention includes a computer program product which is a storage medium including instructions which can be used to program a computer to perform processes of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media, including hard drives, suitable for storing electronic instructions.

Figure 14:
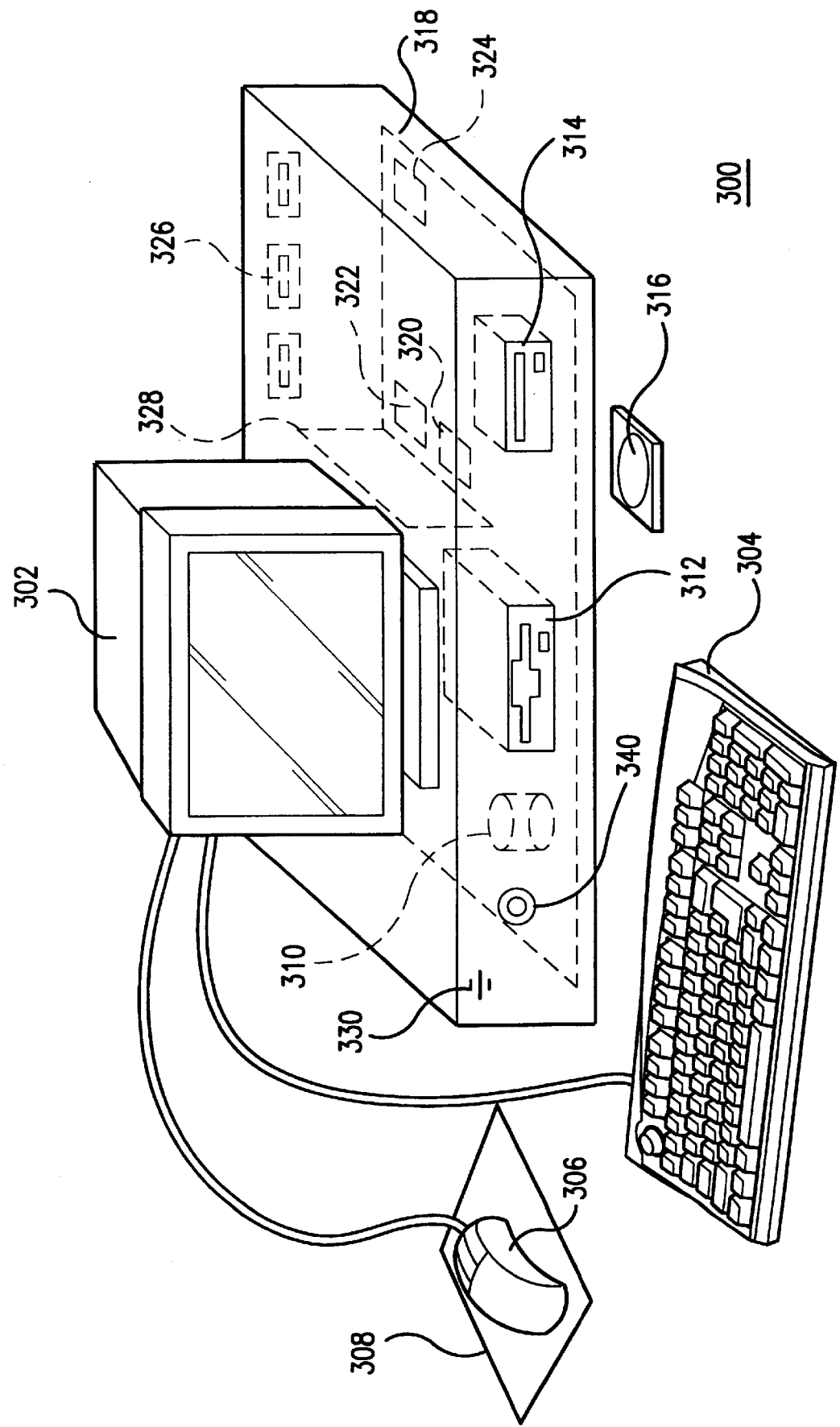
FIG. 14 is a schematic illustration of a general purpose computer 300 programmed according to the teachings of the present invention.

FIG. 14 is detailed schematic diagram of the general purpose computer 300 of FIG. 1. In FIG. 14, the computer 300, for example, includes a display device 302, such as a touch screen monitor with a touch-screen interface, a keyboard 304, a pointing device 306, a mouse pad or digitizing pad 308, a hard disk 310, or other fixed, high density media drives, connected using an appropriate device bus, such as a SCSI bus, an Enhanced IDE bus, a PCI bus, etc., a floppy drive 312, a tape or CD ROM drive 314 with tape or CD media 316, or other removable media devices, such as magneto-optical media, etc., and a mother board 318. The motherboard 318 includes, for example, a processor 320, a RAM 322, and a ROM 324, I/O ports 326 which are used to couple to the image acquisition device 200 of FIG. 1, and optional specialized hardware 328 for performing specialized hardware/software functions, such as sound processing, image processing, signal processing, neural network processing, etc., a microphone 330, and a speaker or speakers 340.

Stored on any one of the above described storage media (computer readable media), the present invention includes programming for controlling both the hardware of the computer 300 and for enabling the computer 300 to interact with a human user. Such programming may include, but is not limited to, software for implementation of device drivers, operating systems, and user applications. Such computer readable media further includes programming or software instructions to direct the general purpose computer 300 to perform tasks in accordance with the present invention.

The programming of general purpose computer 300 may include a software module for digitizing and storing images obtained from an image acquisition device. Alternatively, it should be understood that the present invention can also be implemented to process digital image data obtained by other means, for example from a PACS.

The invention may also be implemented by the preparation of application specific integrated circuits or by interconnecting an appropriate network of conventional component circuits, as will be readily apparent to those skilled in the art.

The performance differences between the probabilistic algorithm and the RGI-based method are small. Both, however, substantially outperform conventional region growing. It is expected that this better segmentation performance will, in the future, result in more meaningful features being extracted from potential lesion regions, and ultimately, in better classification of malignant lesions from normal tissue regions.

Obviously, numerous modifications and variations of the present invention are possible in light of the above teachings. For example, while the above discussion relates largely to detection of lesions in mammograms, the techniques of the present invention are also pertinent to the detection of lung nodules in chest radiographs. Also, segmentation of the abnormality can be preformed also on 3-dimensional datasets. In this extension, the constrained image [h(x,y,z)] would be produced using the original volume image [f(x,y, z)] and a 3-dimensional constraint function. This operation would aid in suppressing distant voxel values. An example of such a 3-dimensional constraint function is a 3-dimensional Gaussian. The corresponding 3-dimensional partitions (i.e., "shells") would be determined by thresholding on the constrained image. The 3-dimensional RGI index or probability index would be calculated from the original 3-dimensional image data. Examples of such abnormalities for segmentation include masses in 3-dimensional medical images (magnetic resonance imaging or ultrasound imaging) of the breast and lung nodules in CT scans of the thorax. It is therefore to be understood that within the scope of the appended claims, the invention may be practiced otherwise than as specifically described herein.

APPENDIX

References:

[1] N. Petrick, H. P. Chan, D. Wei, B. Sahiner, M. A. Helvie, and D. D. Adler, "Automated detection of breast masses on mammograms using adaptive contrast enhancement and texture classification," *Medial Physics*, vol. 23, no. 10, pp. 1685–1696, 1996.

[2] M. L. Comer, S. Liu, and E. J. Delp, "Statistical segmentation of mammograms," in *Digital Mammography* (K. Doi, ed.), International Congress Series, pp. 471–474, Elsevier, 1996.

[3] H. D. Li, M. Kallergi, L. P. Clarke, and V. K. Jain, "Markow random field for tumor detection in digital mammography," *IEEE Transactions on Medial Imaging*, vol. 14, no. 3, pp. 565–576, 1995.

[4] M. Sameti and R. K. Ward, "A fuzzy segmentation algorithm for mammogram partitioning," in *Digital Mammography* (K. Doi, ed.), International Congress Series, pp. 471–474, Elsevier, 1996.

[5] M. Kupinski, M. L. Giger, P. Lu, and Z. Huo, "Computerized detection of mammographic lesions: Performance of artificial neural network with enhanced feature extraction," in *SPIE*, vol. 2434, pp. 598–605, 1995.

[6] J. C. Russ, *The Image Processing Handbook*, CRC Press, 1992.

[7] T. Matsumoto, H. Yoshimura, K. Doi, M. L. Giger, A. Kano, H. MacMahon, K. Abe, and S. M. Montner, "Image feature analysis of false-positive diagnoses produced by automated detection of lung nodules," *Investigative Radiology*, vol. 27, pp. 587–597, 1992.

[8] Z, Huo, M. L. Giger, C. J. Vyborny, U. Bick, and P. Lu, "Analysis of spiculation in the computerized classification of mammographic masses," *Medical Physics*, vol. 22, pp. 1569–1579, 1995.

[9] U. Bick, M. L. Giger, R. A. Schmidt, and K. Doi, "A new single-image method for computer-aided detection of small mammographic masses," in *CAR "95; International Symposium on Computer and Communication Systems for Image Guided Diagnosis and Therapy*, pp. 357–363, 1995.

[10] T. J. Hastie and R. J. Tibshirani, *Generalized Additive Models*, Great Britain: AT&T Bell Labs, 1990.

[11] M. L. Giger, "Current issues in CAD for mammography," in *Digital Mammography* (K. Doi, ed.), International Congress Series, pp. 53–59, Elsevier, 1996.

What is claimed as new and desired to be secured by U.S. Letters Patent is:

1. In a method for the automated segmentation of an abnormality in a medical image, the improvement comprising:

acquiring first image data representative of the medical image;

locating a suspicious site at which the abnormality may exist;

establishing a seed point within the suspicious site;

applying a constraint function relative to the suspicious site based on the location of the seed point; and preprocessing the suspicious site with the constraint function, including multiplying the first image by the constraint function, to produce second image data in which pixel values distant of the seed point are suppressed.

2. The method of claim 1, wherein the preprocessing step comprises:

preprocessing the suspicious site with an isotropic Gaussian function centered on the seed point as the constraint function to produce the second image data.

3. The method of claim 1, wherein the preprocessing step comprises:

preprocessing the suspicious site with an isotropic three dimensional Gaussian function centered on the seed point as the constraint function to produce the second image data.

4. The method according to claim 1, further comprising:

partitioning the site using the second image data to identify pixels in the first image data; and calculating an index based on the identified pixels in the first image data.

5. The method according to claim 4, comprising:

the partitioning step comprising applying plural thresholds to the second image data to partition the second image data at each threshold;

identifying corresponding first image data for the partitioned second image data obtained at each respective threshold; and determining a respective index for each of the partitioned first image data; and determining a preferred partitioning based on the indices determined at each threshold in the preceding step.

6. The method of claim 5, wherein the step of determining a preferred partitioning comprises:

determining which of the determined indices has a maximum value; and segmenting the lesion based on the partitioning established by the threshold resulting in the maximum index.

7. The method of claim 5, comprising:

displaying the first image data with the partitioning defined by the threshold which is determined to result in the maximum index.

8. The method of any one of claims 4–7, wherein the step of calculating the index comprises:

calculating a radial gradient index.

9. The method of any one of claims 4–7, wherein the step of calculating the index comprises:

calculating the index with a probabilistic measure.

10. The method of any one of claim 5–7, wherein the step of calculating the index comprises:

calculating contributions to the index with a probabilistic measure, including computing contributions to the index based on pixel values both within and outside of a partitioned region established at respective of the thresholds.

11. In a system for the automated segmentation of an abnormality in a medical image, the improvement comprising:

a memory having embodied therein medical image information; and a processor coupled to the memory the processor configured to:

acquire first image data representative of the medical image;

locate a suspicious site at which the abnormality may exist;

apply a constraint function relative to the suspicious site based on the location of a seed point; and preprocess the suspicious site with the constraint function and multiply the first image by the constraint function, to produce second image data in which pixel values distant of the seed point are suppressed.

12. The system of claim 11, wherein the processor is further configured to:

preprocess the suspicious site with an isotropic Gaussian function centered on the seed point as the constraint function to produce the second image data.

13. The system of claim 11, wherein the processor is further configured to:

preprocess the suspicious site with an isotropic three dimensional Gaussian function centered on the seed point as the constraint function to produce the second image data.

14. The system according to claim 11, wherein the processor is further configured to:
  partition the site using the second image data to identify pixels in the first image data; and
  calculate an index based on the identified pixels in the first image data.

15. The system according to claim 14, wherein the processor is further configured to:
  apply plural thresholds to the second image data to partition the second image data at each threshold;
  identify corresponding first image data for the partitioned second image data obtained at each respective threshold;
  determine a respective index for each of the partitioned first image data; and
  determine a preferred partitioning based on the indices determined at each threshold.

16. The system of claim 15, wherein the processor is further configured to:
  determine which of the determined indices has a maximum value; and
  segment the lesion based on the partitioning established by the threshold resulting in the maximum index.

17. The system of claim 15, comprising:
  displaying the first image data with the partitioning defined by the threshold which is determined to result in the maximum index.

18. The system of any one of claims 14–17, wherein the processor is further configured to:
  calculate a radial gradient index.

19. The system of any one of claims 14–17, wherein the processor is further configured to:
  calculate the index with a probabilistic measure.

20. The system of any one of claim 15–17, wherein the processor is further configured to:
  calculate contributions to the index with a probabilistic measure and to compute contributions to the index based on pixel values both within and outside of a partitioned region established at respective of the thresholds.

21. A computer readable medium storing computer instructions for the automated segmentation of an abnormality in a medical image, by performing the steps of:
  acquiring first image data representative of the medical image;
  locating a suspicious site at which the abnormality may exist;
  establishing a seed point within the suspicious site;
  applying a constraint function relative to the suspicious site based on the location of the seed point; and
  preprocessing the suspicious site with the constraint function, including multiplying the first image by the constraint function, to produce second image data in which pixel values distant of the seed point are suppressed.

22. The computer readable medium of claim 21, wherein the preprocessing step comprises:
  preprocessing the suspicious site with an isotropic Gaussian function centered on the seed point as the constraint function to produce the second image data.

23. The computer readable medium of claim 21, wherein the preprocessing step comprises:
  preprocessing the suspicious site with an isotropic three dimensional Gaussian function centered on the seed point as the constraint function to produce the second image data.

24. The computer readable medium according to claim 21, storing further instructions for performing the steps comprising:
  partitioning the site using the second image data to identify pixels in the first image data; and
  calculating an index based on the identified pixels in the first image data.

25. The computer readable medium according to claim 24, storing further instructions for performing the steps comprising:
  in the partitioning step, applying plural thresholds to the second image data to partition the second image data at each threshold;
  identifying corresponding first image data for the partitioned second image data obtained at each respective threshold; and
  determining a respective index for each of the partitioned first image data; and
  determining a preferred partitioning based on the indices determined at each threshold in the preceding step.

26. The computer readable medium of claim 25, wherein the step of determining a preferred partitioning comprises:
  determining which of the determined indices has a maximum value; and
  segmenting the lesion based on the partitioning established by the threshold resulting in the maximum index.

27. The computer readable medium of claim 25, storing further instructions for performing the steps comprising:
  displaying the first image data with the partitioning defined by the threshold which is determined to result in the maximum index.

28. The computer readable medium of any one of claims 24–27, wherein the step of calculating the index comprises:
  calculating a radial gradient index.

29. The computer readable medium of any one of claims 24–27, wherein the step of calculating an index comprises:
  calculating the index with a probabilistic measure.

30. The computer readable medium of any one of claim 25–27, wherein the step of calculating an index comprises:
  calculating contributions to the index with a probabilistic measure, including computing contributions to the index based on pixel values both within and outside of a partitioned region established at respective of the thresholds.

* * * * *